(12) United States Patent
Nishida

(10) Patent No.: US 9,957,922 B2
(45) Date of Patent: May 1, 2018

(54) WATER SUPPLY CONTROL APPARATUS FOR IN-CYLINDER INJECTION TYPE INTERNAL COMBUSTION ENGINE

(71) Applicant: TOYOTA JIDOSHA KABUSHIKI KAISHA, Toyota-shi, Aichi-ken (JP)

(72) Inventor: Kentaro Nishida, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days. days.

(21) Appl. No.: 15/032,152

(22) PCT Filed: Nov. 6, 2014

(86) PCT No.: PCT/JP2014/079429
§ 371 (c)(1),
(2) Date: Apr. 26, 2016

(87) PCT Pub. No.: WO2015/068761
PCT Pub. Date: May 14, 2015

(65) Prior Publication Data
US 2016/0258388 A1    Sep. 8, 2016

(30) Foreign Application Priority Data

Nov. 8, 2013 (JP) ................................. 2013-231830

(51) Int. Cl.
*F02M 25/03* (2006.01)
*F02D 19/12* (2006.01)
(Continued)

(52) U.S. Cl.
CPC ........... *F02M 25/03* (2013.01); *F02B 17/005* (2013.01); *F02B 23/101* (2013.01); *F02D 19/12* (2013.01);
(Continued)

(58) Field of Classification Search
CPC .............. F02M 25/03; F02M 35/1085; F02M 25/0227; F02M 25/0222; F02M 25/028;
(Continued)

(56) References Cited

U.S. PATENT DOCUMENTS 7,178,486 B2 * 2/2007 Hupli ...................... F02B 47/02
123/25 A
7,581,528 B2    9/2009 Stein et al.
(Continued)

FOREIGN PATENT DOCUMENTS

JP    2009138661 A  *  6/2009
JP    2011-111897       6/2011
(Continued)

OTHER PUBLICATIONS

JP 2009138661 A—Partial English Translation (Human).*
(Continued)

*Primary Examiner* — Joseph Dallo
*Assistant Examiner* — Scott A Reinbold
(74) *Attorney, Agent, or Firm* — Finnegan, Henderson, Farabow, Garrett & Dunner, LLP

(57) ABSTRACT

A water supply control apparatus is applied to an in-cylinder injection type internal combustion engine (1) which injects fuel from a central area (2a) in a cylinder (2). The water supply control apparatus comprises a condensed water supply mechanism (22) where a state of supplying condensed water (CW) into the cylinder (2) is changeable between a first supply state that the condensed water (CW) is supplied to a whole inside of the cylinder (2) and a second supply state that the condensed water (CW) is limitedly supplied to the central area (2a) of the cylinder (2). In the second supply state, the supply amount of condensed water supplied into (Continued)

the cylinder (2) in the second supply state is less than the supply amount of condensed water supplied into the cylinder (2) in the first supply state.

10 Claims, 3 Drawing Sheets

(51) Int. Cl.
| | |
|---|---|
| *F02B 17/00* | (2006.01) |
| *F02M 25/022* | (2006.01) |
| *F02B 23/10* | (2006.01) |
| *F02M 35/108* | (2006.01) |
| *F02M 25/028* | (2006.01) |
| *F02D 41/00* | (2006.01) |
| *F02M 26/35* | (2016.01) |
| *F02B 31/00* | (2006.01) |
| *F02M 26/23* | (2016.01) |

(52) U.S. Cl.
CPC ....... *F02D 41/0025* (2013.01); *F02M 25/028* (2013.01); *F02M 25/0222* (2013.01); *F02M 25/0227* (2013.01); *F02M 35/1085* (2013.01); *F02B 2031/006* (2013.01); *F02M 26/23* (2016.02); *F02M 26/35* (2016.02); *Y02T 10/125* (2013.01)

(58) Field of Classification Search
CPC ........ F02M 26/35; F02M 26/23; F02D 19/12; F02D 41/0025; F02B 17/005; F02B 23/101; F02B 2031/006
USPC ....................................................... 123/25 C
See application file for complete search history.

(56) References Cited

U.S. PATENT DOCUMENTS

| | | | |
|---|---|---|---|
| 7,730,872 B2 | 6/2010 | Leone et al. | |
| 7,739,985 B2 | 6/2010 | Keays | |
| 7,938,103 B2 * | 5/2011 | Keays | F02B 47/02 |
| | | | 123/25 E |
| 8,935,996 B2 * | 1/2015 | Mulye | F02B 47/02 |
| | | | 123/25 A |
| 2007/0215110 A1 * | 9/2007 | Stein | F02D 19/0628 |
| | | | 123/431 |
| 2012/0298071 A1 | 11/2012 | Horibe et al. | |
| 2013/0054119 A1 | 2/2013 | Yokota et al. | |
| 2015/0122237 A1 * | 5/2015 | Kato | F02B 47/10 |
| | | | 123/568.11 |
| 2016/0032870 A1 | 2/2016 | Nishida | |
| 2016/0115861 A1 | 4/2016 | Ito et al. | |
| 2016/0245164 A1 | 8/2016 | Nishida | |

FOREIGN PATENT DOCUMENTS

| | | |
|---|---|---|
| WO | WO 20141174644 A1 | 10/2014 |
| WO | WO 2014/199475 A1 | 12/2014 |

OTHER PUBLICATIONS

Office Action issued in U.S. Appl. No. 15/031,784 dated Jun. 15, 2017.

Notice of Allowance issued in U.S. Appl. No. 15/031,784 dated Jan. 9, 2018.

* cited by examiner

WATER SUPPLY CONTROL APPARATUS FOR IN-CYLINDER INJECTION TYPE INTERNAL COMBUSTION ENGINE

CROSS-REFERENCE TO RELATED APPLICATIONS

This application is a national phase application of International Application No. PCT/JP2014/079429, filed Nov. 6, 2014, and claims the priority of Japanese Application No. 2013-231830, filed Nov. 8, 2013, the content of both of which is incorporated herein by reference.

TECHNICAL FIELD

The present invention relates to a water supply control apparatus which supplies water into a cylinder in an in-cylinder injection type internal combustion engine.

BACKGROUND ART

There is known to be a water supply control apparatus applied to a diesel engine which is an in-cylinder injection type internal combustion engine, in which condensed water generated in an EGR cooler is supplied into the cylinder via an intake passage to improve the exhaust characteristic (see Patent Literature 1).

CITATION LIST

Patent Literature

PTL1: JP-A-2011-111897

SUMMARY OF INVENTION

Technical Problem

In various kinds of operating conditions, for supplying water effectively, it is necessary to supply the water while managing the remaining amount of suppliable water. Even when water should be supplied for improvement of the exhaust characteristic, in a case where the remaining amount of water is insufficient, the water supply control apparatus disclosed in the Patent Literature 1 stops or reduces the water supply. As a result of that, the exhaust characteristic is sometimes not improved sufficiently.

With that problem, the present invention aims to provide a water supply control apparatus for in-cylinder injection type internal combustion engine which is capable of reducing the supply amount of water supplied into a cylinder without deterioration of the exhaust characteristic.

Solution to Problem

A water supply control apparatus as one aspect of the present invention is a water supply control apparatus for an in-cylinder injection type internal combustion engine, the water supply control apparatus being applied to the in-cylinder injection type internal combustion engine which injects fuel from a central area in a cylinder, and comprising: a water supply device where a state of supplying water into the cylinder is changeable between a first supply state that the water is supplied to a whole inside of the cylinder and a second supply state that the water is supplied into the cylinder so that a supply amount of the water supplied to a central area lying in the cylinder is more than a supply amount of the water supplied to a peripheral area lying in the cylinder; and a control device which is configured to control the water supply device so that the supply amount of the water supplied into the cylinder in a case of the second supply state is less than the supply amount of the water supplied into the cylinder in a case of the first supply state.

In a case where condensed water is supplied into the cylinder, gas density lowers in an area where the condensed water is supplied. Due to this, it becomes easy to diffuse fuel spray injected from the central area of the cylinder. Thereby, since it is promoted to lead air into the fuel spray, oxygen density at the moment of ignition rises. As the oxygen density at the moment of ignition is higher, the generation amount of smoke gets lower. Accordingly, since the smoke is reduced by the supply of condensed water into the cylinder, the exhaust characteristic is improved. Further, in a case where fuel is injected from the central area of the cylinder, when water is supplied into the cylinder, an area where the combustion of the inside of the cylinder would be affected by supply of water into the cylinder is mainly the central area lying in the cylinder. The combustion is less affected by supply to the peripheral area lying in the cylinder.

According to this water supply control apparatus, it is possible to supply water into the cylinder so that the supply amount of water supplied to the central area lying in the cylinder is more than to the peripheral area lying in the cylinder. Due to this, it is possible to realize water supply in consideration of the affection on the combustion by the water supply. Further, since the supply amount of water supplied into the cylinder in a case of the second supply state is less than the supply amount of water supplied into the cylinder in a case of the first supply state, by supplying water so that the supply amount of water supplied to the central area lying in the cylinder is more than the supply amount to the peripheral area lying in the cylinder, the supply amount of water supplied to the peripheral area lowers. Thereby, it is possible to reduce the water supply amount while ensuring the effects obtained by the water supply without deterioration of the exhaust gas characteristic.

In one embodiment of the water supply apparatus as one aspect of the present invention, the water supply control apparatus may further comprise a storage tank which stores water, wherein the control device may be configured to control the water supply device so that water is supplied into the cylinder in the second supply state, in a case of an insufficient water state that a storage water quantity in the storage tank is equal to or less than a predetermined quantity. According to this embodiment, in the case of the insufficient water state, it is possible to reduce the water supply amount while supplying water so that the supply amount of water supplied to the central area lying in the cylinder is more than the supply amount of water supplied to the peripheral area lying in the cylinder. Therefore, it is possible to suppress depletion of the storage tank without deterioration of the exhaust characteristic.

As one embodiment of the water supply control apparatus as one aspect of the present invention, the water supply device may realize the second supply state by supplying water to the central area lying in the cylinder and also stopping supply of water to the peripheral area lying in the cylinder. According to this, it is possible to realize the second supply state that water is supplied so that the supply amount of water supplied to the central area lying in the cylinder is more than the supply amount of water supplied to the peripheral area lying in the cylinder.

In one embodiment of the water supply control apparatus as one aspect of the present invention, the water supply control device may comprise as the water supply device, a first intake port which makes intake gas flow into the central area lying in the cylinder; a second intake port which makes intake gas flow into the peripheral area lying in the cylinder; a first supply device which supplies condensed water to the intake gas flowing into the central area of the cylinder; a second supply device which supplies condensed water to at least the second intake port; and a supply change device which is capable of changing the supply amount of water supplied by the first supply device and the supply amount of water supplied by the second supply device.

In the above embodiment, the following constructions may be applied. The in-cylinder injection type internal combustion engine may have an intake passage which divides into the first intake port and the second intake port, and the second supply device may be provided to the second intake port lying at a position further downstream than a position where the intake passage divides into the first intake port and the second intake port. The first supply device may be provided so as to face the central area lying in the cylinder. The in-cylinder injection type internal combustion engine may have an intake passage which divides into the first intake port and the second intake port, and the second supply device may be provided to the intake passage at a position further upstream than a position where the intake passage divides into the first intake port and the second intake port. According to the above constructions, by changing the supply amount of water supplied to each of the first and second intake ports, which have different characteristic from each other, it is possible to supply water into the cylinder so that the supply amount of water supplied to the central area lying in the cylinder is more than the supply amount of water supplied to the peripheral area lying in the cylinder.

The water may be supplied into the cylinder in a high load range of the in-cylinder injection type internal combustion engine. According to this embodiment, since water is supplied into the cylinder in the high load range where the smoke and the NOx are easily generated, it is possible to reduce the smoke and the NOx effectively.

DESCRIPTION OF EMBODIMENTS

A First Embodiment

Figure 1:
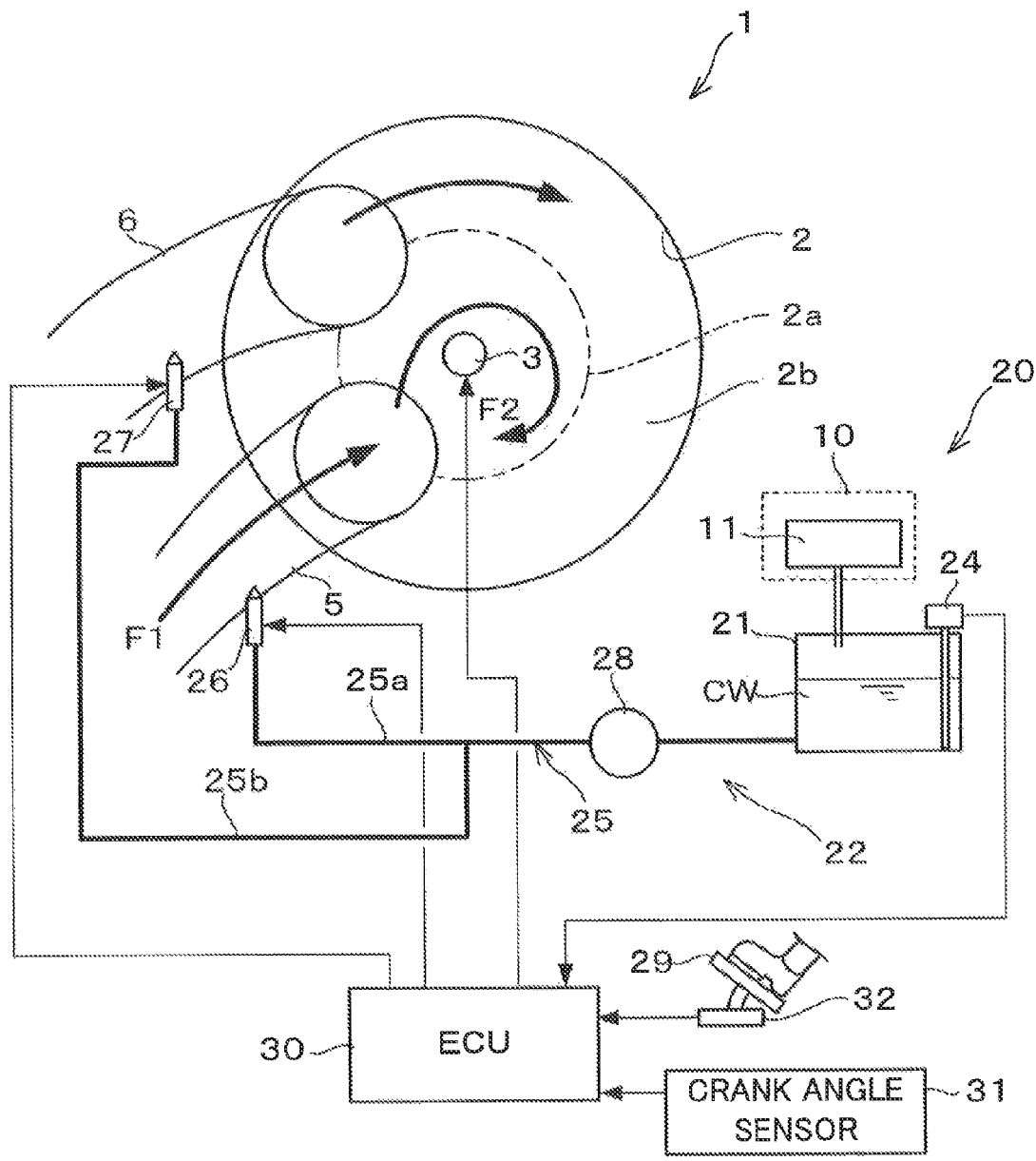
FIG. 1 is a diagram showing schematically an essential portion of an internal combustion engine where a water supply control apparatus according to a first embodiment of the present invention is applied.

As shown in FIG. 1, an internal combustion engine 1 is configured as a diesel engine which is an in-cylinder injection type internal combustion engine. The internal combustion engine 1 has a cylinder 2, and a fuel injection valve 3 is provided at a central area 2a of the cylinder 2. Although only one cylinder 2 is shown in FIG. 1, the internal combustion engine 1 is configured as a serial four-cylinder type internal combustion engine where four cylinders 2 are aligned in one direction. The fuel injection valve 3 injects fuel radially from the central area 2a of the cylinder 2. The cylinder 2 is provided with two kinds of intake ports 5 and 6. Intake gas is led into the cylinder 2 via these intake ports 5 and 6. A first intake port 5 is configured as a well-known helical intake port. As shown by an arrow in FIG. 1, the first intake port 5 makes an intake gas flow into the central area 2a of the cylinder 2 as a swirling flow F2 by adding rotation to an intake flow F1. On the other hand, a second intake port 6 is configured as a well-known tangential intake port. The second intake port 6 leads intake gas flow so that the intake gas flows along an inner circumference of the cylinder 2 to make the intake gas flow into a peripheral area 2b of the cylinder 2.

After being led via the intake ports 5 and 6 into and filled in the cylinder 2, the intake gas is compressed in a compression stroke. When fuel is injected from the fuel injection valve 3 at a late stage of the compression stroke, the fuel self-ignites and burns while involving the intake gas in the cylinder 2. After burning, exhaust gas is led to an exhaust system not illustrated, purified by an exhaust gas purifying device such as an exhaust gas purification catalyst and a filter, and then, the exhaust gas is discharged to atmospheric air.

The internal combustion engine 1 is provided with a well-known EGR device 10 which recirculates a cart of the exhaust gas to an intake system, for reduction of NOx and improvement of fuel, efficiency. The EGR device 10 includes an EGR cooler 11 which cools EGR gas taken out from the exhaust system. As known well, the EGR cooler 11 uses cooling water of the internal combustion engine 1 as refrigerant, and makes the refrigerant and the warm exhaust gas exchange heat therebetween to lower the temperature of the EGR gas. By lowering the temperature of the EGR gas, moisture included in the EGR gas is condensed. Due to this, condensed water is generated in the EGR cooler 11.

In order to collect and process condensed water generated in the EGR cooler 11, the internal combustion engine 1 is provided with a condensed water processing device 20. The condensed water processing device 20 comprises a storage tank 21 which stores condensed water CW; and a condensed water supply mechanism 22 as a water supply device which supplies the condensed water CW stored in the storage tank 21 to the intake system of the internal combustion engine 1. The storage tank 21 is provided with a water level sensor 24 which outputs a signal according to the storage water amount (the water level) of the condensed water CW stored in the storage tank 21. The condensed water supply mechanism 22 has a supply passage 25 connecting the storage tank 21 and each of the intake ports 5 and 6. The supply passage 25 divides at the downstream side into a first branched passage 25a which is connected with the first intake port 5 and a second branched passage 25b which is connected with the second intake port 6. At an end portion of each of the branched passages 25a and 25b, adding water valves 26 and 27 are provided so that the tips of the adding water valves 26 and 27 are exposed inside the intake ports 5 and 6 respectively. Further, the supply passage 25 is provided with a supply pump 28. It is possible to change the supply amount of water supplied to each of the first and second intake ports 5 and 6 by opening and closing each of the adding water valves 26 and 27 and adjusting a valve opening period for each of them. Each of the adding water valves 26 and 27 corresponds to a supply change device. The first branched passage 25a which supplies condensed water to the first intake port 5 corresponds to a first supply device. The second branched passage 25b which supplies condensed water to the second intake port 6 corresponds to a second supply device.

As mentioned above, the first intake port 5 makes intake gas flow into the central area 2a lying in the cylinder 2. Due to this, by supplying condensed water to the first intake port 5 via the first branched passage 25a, it is possible to supply condensed water into the cylinder 2 so that the supply amount of condensed water supplied to the central area 2a lying in the cylinder 2 is more than the supply amount supplied to the peripheral area 2b lying in the cylinder 2. Further, since condensed water is supplied to both of the intake ports 5 and 6 via the two branched passages 25a and 25b, it is possible to supply condensed water to a whole inside of the cylinder 2. By supplying condensed water into the cylinder 2, a gas density of an area where the condensed water has been supplied lowers. Due to this, fuel spray injected from the fuel injection valve 3 becomes easy to diffuse. Thereby, it is promoted to lead air into the fuel spray. Due to this, oxygen density at the moment of ignition rises. On the other hand, as the oxygen density at the moment of ignition is higher, the generation amount of smoke lowers. Accordingly, since the smoke is reduced by the supply of condensed water into the cylinder 2, the exhaust characteristic is improved.

In a case where fuel is injected from the central area 2a lying in the cylinder 2 like the internal combustion engine 1, it is known that an area where the combustion in the cylinder 2 would be affected by supply of condensed water into the cylinder 2 is mainly the central area 2a lying in the cylinder 2, and the combustion is less affected by the supply to the peripheral area 2b. With that, in the present embodiment, in a case where the condensed water is insufficient, the condensed water is supplied so that the supply amount of condensed water supplied to the central area 2a lying in the cylinder 2 is more than the supply amount to the peripheral area 2b lying in the cylinder 2. Thereby, by reducing the supply amount of condensed water supplied to the peripheral area 2b lying in the cylinder 2, which affects the combustion little, the total supply amount of condensed water is reduced.

As shown in FIG. 1, the internal combustion engine 1 is provided with an engine control unit (ECU) 30 configured as a computer which controls various portions of the internal combustion engine 1. The ECU 30 controls main operations of the fuel injection valve 3 and the like of the internal combustion engine 1. In the present embodiment, the ECU 30 is also used for processing of condensed water. To the ECU 30, signals are inputted from a lot of sensors which detect various physical amounts for obtaining the operating conditions of the internal combustion engine 1. For example, as the sensors relating to the present invention, a crank angle sensor 31, an accelerator opening degree sensor 32, and the like are provided to the internal combustion engine 1. The crank angle sensor 31 outputs a signal according to a crank angle of the internal combustion engine 1. The accelerator opening degree sensor 32 outputs a signal according to the depression amount (the accelerator opening degree) of an accelerator pedal 29 provided to the internal combustion engine 1. The output signals from these sensors are inputted to the ECU 30.

Figure 2:
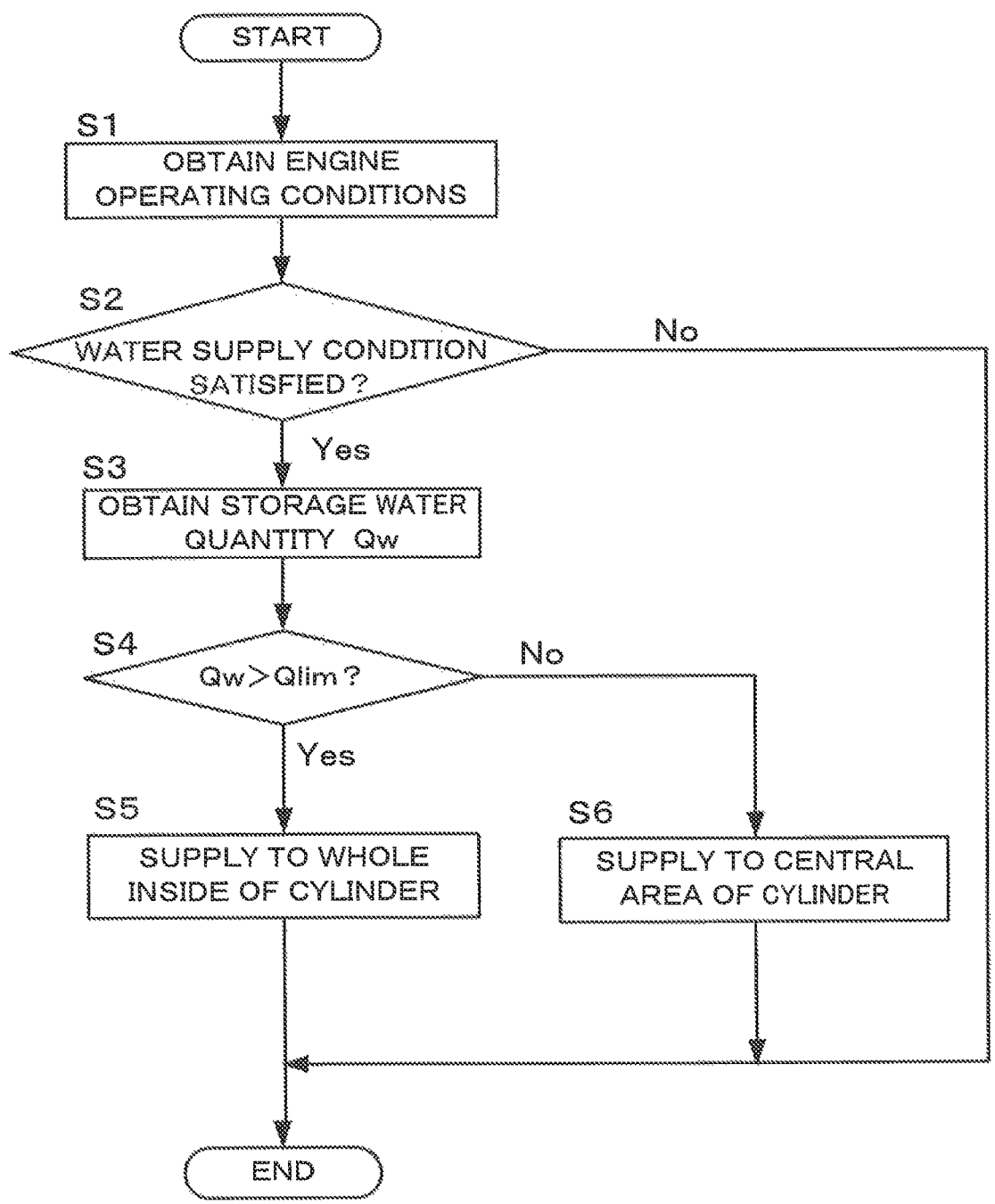
FIG. 2 is a flow chart showing one example of a control routine according to the first embodiment.

Control relating to the above mentioned supply of condensed water is realized by the ECU 30 which executes a control routine shown in FIG. 2. A computer program for the control routine shown in FIG. 2 is stored in the ECU 30. The computer program is read out as appropriate, and executed repeatedly at predetermined intervals. At step S1, the ECU 30 obtains engine operating conditions of the internal combustion engine 1. The ECU 30 obtains the engine speed and the load of the internal combustion engine 1 as the engine operating conditions. The ECU 30 obtains the engine speed by referring to the output signal from the crank angle sensor 31, and obtains the load by referring to the output signal from the accelerator opening degree sensor 32.

At step S2, the ECU 30 determines whether a water supply condition has been satisfied. The water supply condition is a condition for supplying condensed water to the internal combustion engine 1. Here, it is determined whether the water supply condition has been satisfied depending on whether the load of the internal combustion engine 1 obtained at step S1 is in a high load range where the load exceeds a predetermined threshold. In a case where the water supply condition has been satisfied, the ECU 30 goes to step S3, and in a case where the water supply condition is not satisfied, the ECU 30 skips the following processing and ends the routine of this turn. In this control routine, the supply of condensed water is executed in a case where the water supply condition has been satisfied because the load of the internal combustion engine 1 falls into the high load range. Accordingly, it is possible to reduce effectively the smoke and NOx in the high load range where the smoke and NOx are easily generated, At step S3, the ECU 30 obtains the storage water quantity Qw of the storage tank 21 by referring to the output signal from the water level sensor 24. At succeeding step S4, the ECU 30 determines whether the storage water quantity Qw of the storage tank 21 is beyond a lower limit quantity Qlim. The lower limit quantity Qlim is a predetermined quantity for determining whether the storage water quantity Qw of the storage tank 21 is in an insufficient water state. In a case where the storage water quantity Qw is beyond the lower limit quantity Qlim, it is unnecessary to save condensed water stored. Therefore, the ECU 30 goes to step S5. On the other hand, in a case where the storage water quantity Qw is equal to or lower than the lower limit quantity Qlim, the ECU determines that the storage water quantity Qw is in the insufficient water state and goes to step S6.

At step S5, the ECU 30 opens the two adding water valves 26 and 27 to supply condensed water to both of the first and second intake ports 5 and 6 so that the condensed water is supplied to the whole inside of the cylinder 2. On the other hand, at step S6, the ECU 30 opens the adding water valve 26 and closes the adding water valve 27 to supply condensed water only to the first intake port 5 so that the supply amount of condensed water supplied to the central area 2a lying in the cylinder 2 is more than the supply amount to the peripheral area 2b lying in the cylinder 2. Then, the ECU ends the routine of this turn. In addition, at step S6, the valve opening period of the adding water valve 26 is controlled so that the supply amount of condensed water supplied to the first intake port 5 is less in comparison with the supply amount of condensed water at step S5.

According to the control routine shown in FIG. 2, the state of supplying condensed water into the cylinder 2 is changed depending on whether the storage water quantity Qw is in the insufficient water state or not, and in a case of the insufficient water state, the condensed water is supplied so that the supply amount of condensed water supplied to the central area 2a lying in the cylinder 2a is more than the supply amount of condensed water supplied to the peripheral area 2b lying in the cylinder 2a. As a result of that, the supply amount of condensed water supplied to the peripheral area 2b lying in the cylinder 2 is lowered. Accordingly, it is possible to reduce the water supply amount while ensuring the effects obtained by the supply of condensed water without deterioration of the exhaust characteristic. Thereby, it is possible to suppress depletion of the storage tank 21 without the deterioration of the exhaust characteristic. The ECU 30 functions as a control device of the present invention by executing the control routine shown in FIG. 2.

A Second Embodiment

Next, in reference to FIG. 3, a second embodiment of the present invention will be described. The second embodiment is shared with the first embodiment except a method of supplying condensed water. Hereinafter, in FIG. 3, the same reference signs are assigned to the constructions shared with the first embodiment, and the explanations thereof will be omitted.

A condensed water supply mechanism 50 as the water supply device provided in the second embodiment has a supply passage 51 for supplying condensed water in the storage tank 21 to the internal combustion engine 1. The supply passage 51 divides at its downstream side into a first branched passage 51a connected with the cylinder 2 and a second branched passage 51b connected with the intake passage 53 lying at the upstream side of the intake ports 5 and 6. At an end portion of the first branched passage 51a, an adding water valve 56 is provided in a state that a tip of the adding water valve 56 is exposed in the inside of the cylinder 2 and faced to the central area 2a lying in the cylinder 2. At the end portion of the second branched passage 51b, an adding water valve 57 is provided in a state that a tip of the adding water valve 57 is exposed in the inside of the intake passage 53. Further, the supply passage 51 is provided with a supply pump 58.

Figure 3:
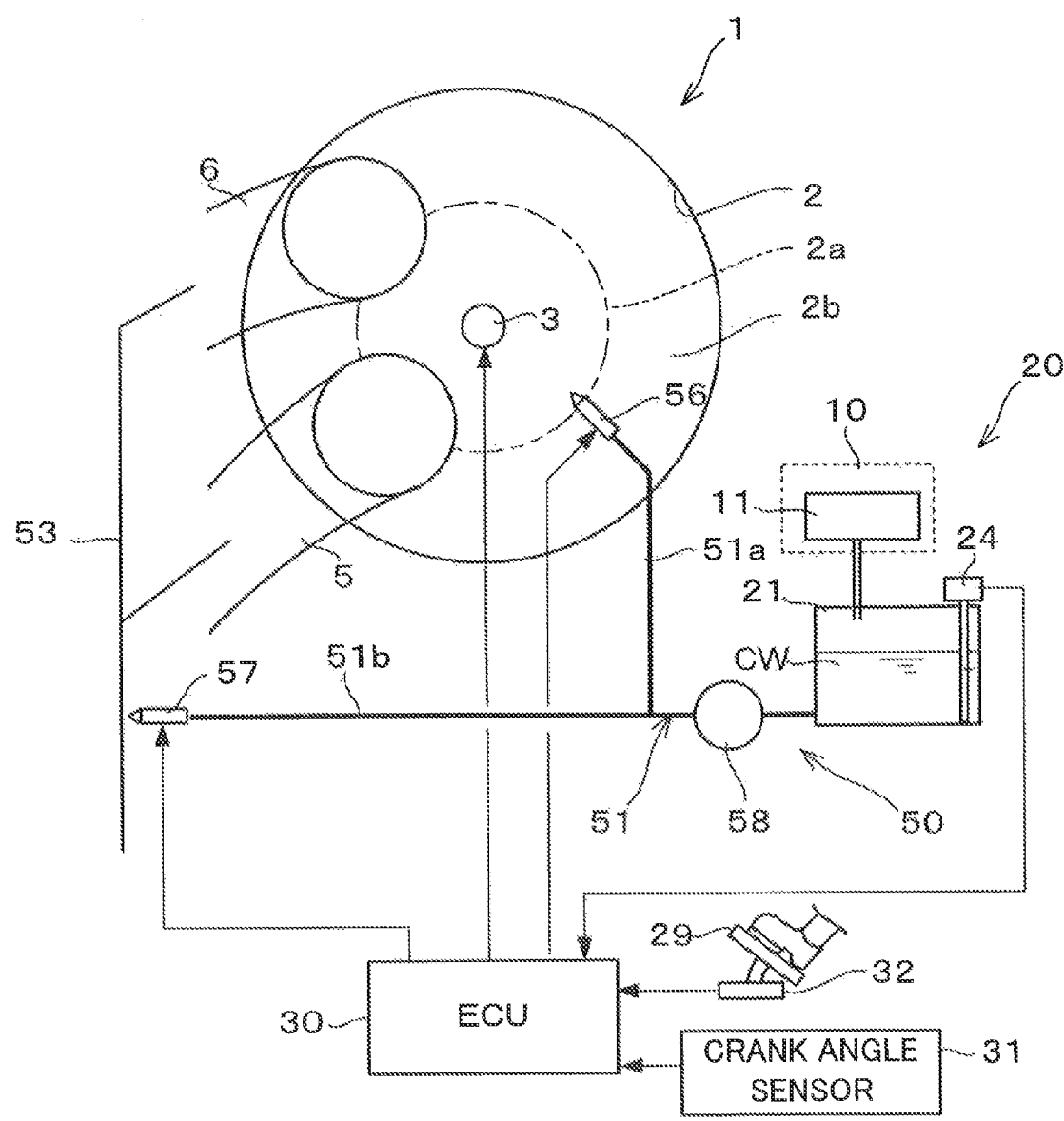
FIG. 3 is a diagram showing schematically an essential portion of an internal combustion engine where a water supply control apparatus according to a second embodiment of the present invention is applied.

According to the configuration shown in FIG. 3, by closing the adding water valve 57 while opening the adding water valve 56, it is possible to supply condensed water so that the supply amount of condensed water supplied to the central area 2a lying in the cylinder 2 is more than the supply amount of condensed water supplied to the peripheral area 2b lying in the cylinder 2. On the other hand, by opening the adding water valve 57 while closing the adding water valve 56, condensed water is led to each of the intake ports 5 and 6 from the intake passage 53. Due to this, it is possible to supply the condensed water to the whole inside of the cylinder 2. Accordingly, by controlling each of the adding water valves 56 and 57, it is possible to change the state of supplying condensed water into the cylinder 2. As with the first embodiment, control of each of the adding water valves 56 and 57 is executed by the ECU 30. That is, the ECU 30 functions as the control device of the present invention by executing the control routine shown in FIG. 2, and is capable of performing the effects similar to the first embodiment.

The present invention is not limited to the above embodiments, and may be executed in various embodiments as long as within the subject matter of the present invention. In the above each embodiment, as water to be supplied into the cylinder 2, condensed water generated by the EGR cooler of the EGR device is used. However this is just one case. For example, water which is used only for being supplied into a cylinder may be prepared, and the water supply may be realized by using this water.

In the above each embodiment, the condensed water is supplied so that the supply amount of condensed water supplied to the central area 2a lying in the cylinder 2 is more than the supply amount of condensed water supplied to the peripheral area 2b lying in the cylinder 2. Each embodiment may include such a case that, as a result of water supply where the condensed water is supplied only to the central area 2a lying in the cylinder 2, the supply amount of the condensed water supplied to the peripheral area 2b lying in the cylinder 2 becomes zero.

The invention claimed is:

1. A water supply control apparatus for an in-cylinder injection type internal combustion engine, the water supply control apparatus being applied to the in-cylinder injection type internal combustion engine which injects fuel from a central area in a cylinder, and comprising:
   a water supply wherein a state of supplying water into the cylinder from the water supply is changeable between a first supply state in which the water is supplied to an inside of the cylinder and a second supply state in which the water is supplied into the cylinder so that a supply amount of the water supplied to a central area lying in the cylinder is more than a supply amount of the water supplied to a peripheral area lying in the cylinder; and
   a computer configured to control the water supply so that the supply amount of the water supplied into the cylinder in a case of the second supply state is less than the supply amount of the water supplied into the cylinder in a case of the first supply state.

2. The water supply control apparatus according to claim 1, further comprising a storage tank which stores water, wherein
   the computer is configured to control the water supply so that water is supplied into the cylinder in the second supply state, in a case of an insufficient water state that a storage water quantity in the storage tank is equal to or less than a predetermined quantity.

3. The water supply control apparatus according to claim 1, wherein
   the water supply realizes the second supply state by supplying water to the central area lying in the cylinder and also stopping supply of water to the peripheral area lying in the cylinder.

4. The water supply control apparatus according to claim 1, wherein the water supply further comprises
   a first intake port which makes intake gas flow into the central area lying in the cylinder;
   a second intake port which makes intake gas flow into the peripheral area lying in the cylinder;
   a first valve configured to supply condensed water to the intake gas flowing into the central area of the cylinder; and
   a second valve configured to supply condensed water to at least the second intake port
   wherein the computer is configured to change the supply amount of water supplied by the first valve and the supply amount of water supplied by the second valve.

5. The water supply control apparatus according to claim 4, wherein
   the first valve is provided to the first intake port.

6. The water supply control apparatus according to claim 5, wherein
   the in-cylinder injection type internal combustion engine has an intake passage which divides into the first intake port and the second intake port, and
   the second valve is provided to the second intake port lying at a position further downstream than a position where the intake passage divides into the first intake port and the second intake port.

7. The water supply control apparatus according to claim 4, wherein
   the first valve is provided so as to face the central area lying in the cylinder.

8. The water supply control apparatus according to claim 7, wherein
the in-cylinder injection type internal combustion engine has an intake passage which divides into the first intake port and the second intake port, and
the second valve is provided to the intake passage at a position further upstream than a position where the intake passage divides into the first intake port and the second intake port.

9. The water supply control apparatus according to claim 1, wherein
the water is supplied into the cylinder in a high load range of the in-cylinder injection type internal combustion engine.

10. The water supply control apparatus according to claim 1, wherein in the first supply state the water is supplied to an inside of the cylinder so as to make no difference between the supply amount of the water supplied to the central area lying in the cylinder and the supply amount of the water supplied to the peripheral area lying in the cylinder.

* * * * *